United States Patent
Park et al.

(10) Patent No.: US 8,421,931 B2
(45) Date of Patent: Apr. 16, 2013

(54) REMOTE CONTROL WITH USER PROFILE CAPABILITY

(75) Inventors: Joon Young Park, Libertyville, IL (US); Nicolas Lhuillier, Versailles (FR); Samir N. Mehta, Hawthorn Woods, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1365 days.

(21) Appl. No.: 11/616,811

(22) Filed: Dec. 27, 2006

(65) Prior Publication Data

US 2008/0163301 A1    Jul. 3, 2008

(51) Int. Cl.
     *H04N 5/00*      (2011.01)

(52) U.S. Cl.
     USPC .......................................................... 348/734

(58) Field of Classification Search .................. 348/734, 348/552, 553; 340/825.69, 825.72; 345/169, 345/172
See application file for complete search history.

(56) References Cited

U.S. PATENT DOCUMENTS

| | | | | |
|---|---|---|---|---|
| 6,359,661 | B1 * | 3/2002 | Nickum ........................ | 348/734 |
| 6,445,306 | B1 * | 9/2002 | Trovato et al. .............. | 340/12.25 |
| 6,493,688 | B1 * | 12/2002 | Das et al. ........................ | 706/20 |
| 6,906,696 | B2 * | 6/2005 | Allport ........................... | 345/156 |
| 6,971,121 | B2 * | 11/2005 | West et al. ..................... | 725/142 |
| 7,006,881 | B1 | 2/2006 | Hoffberg et al. | |
| 7,240,333 | B2 * | 7/2007 | Mainwaring et al. ......... | 717/127 |
| 7,260,823 | B2 * | 8/2007 | Schlack et al. ..................... | 725/9 |
| 7,307,668 | B2 * | 12/2007 | Thrall et al. ................... | 348/556 |
| 2002/0059588 | A1 * | 5/2002 | Huber et al. ..................... | 725/35 |
| 2002/0085045 | A1 | 7/2002 | Vong et al. | |
| 2003/0070168 | A1 * | 4/2003 | Stone .............................. | 725/37 |
| 2003/0076299 | A1 * | 4/2003 | Trajkovic ...................... | 345/157 |
| 2003/0226150 | A1 * | 12/2003 | Berberet et al. ................ | 725/94 |
| 2004/0010808 | A1 * | 1/2004 | deCarmo ...................... | 725/139 |
| 2004/0060063 | A1 * | 3/2004 | Russ et al. ...................... | 725/46 |
| 2005/0005308 | A1 * | 1/2005 | Logan et al. .................. | 725/135 |
| 2005/0028207 | A1 | 2/2005 | Finseth et al. | |
| 2005/0076367 | A1 * | 4/2005 | Johnson et al. ................. | 725/58 |
| 2005/0172319 | A1 | 8/2005 | Reichardt et al. | |
| 2006/0010467 | A1 | 1/2006 | Segel | |
| 2006/0020973 | A1 | 1/2006 | Hannum et al. | |
| 2006/0053449 | A1 | 3/2006 | Gutta | |
| 2006/0064495 | A1 * | 3/2006 | Tu .................................. | 709/228 |
| 2006/0129458 | A1 | 6/2006 | Maggio | |
| 2007/0005795 | A1 * | 1/2007 | Gonzalez ....................... | 709/232 |
| 2007/0136745 | A1 * | 6/2007 | Garbow et al. ................. | 725/34 |

OTHER PUBLICATIONS

PCT Search Report & Written Opinion, Re: Application #PCT/US07/83301; Jun. 9, 2008.

* cited by examiner

*Primary Examiner* — Paulos M Natnael
(74) *Attorney, Agent, or Firm* — Stewart M. Wiener

(57) ABSTRACT

A control unit (101), such as a remote control device, includes a profile selector (104). The profile selector (104), which may be a single profile selector button integrated into the side or top of a remote control, allows quick and simple selection of an operating mode or user profile. The control unit (101) includes an indicator (107) that provides indicia of the currently selected mode or profile. Examples of indicators include multicolored lights and display devices. Where multicolored lights are used as the indicator (107), actuation of the profile selector (104) causes the indicator (107) to change from a first color to a second color.

19 Claims, 4 Drawing Sheets

REMOTE CONTROL WITH USER PROFILE CAPABILITY

BACKGROUND

1. Technical Field

This invention relates generally to control devices having user profiles associated therewith, and more specifically to a control device, such as a remote control device, having a profile selector for selecting a customizable user profile and a profile indicator for indicating which profile is selected.

2. Background Art

Home entertainment and home entertainment systems are becoming increasingly more feature packed, sophisticated, and complex. While once a television set could only receive two or three channels, cable and satellite systems now deliver hundreds of channels at the click of a button. What's more, video and audio content is now delivered in surround sound stereo with high definition pictures.

With the multitude of channel options now available, it is sometimes cumbersome for a family member to decide what to watch. Rather than having to browse through hundreds of channel listings to pick a desired program, people generally tend to gravitate towards a select few channels. In other words, one family member may to prefer to generally watch a few sports and local channels, while another family member prefers to watch movie and music channels.

To accommodate these differing tastes, receiver boxes with channel guide preferences have been developed. With one of these receiver boxes, a user may program a channel guide to include only those channels that match his particular tastes. When selecting the channel guide option from a general menu, the user may then select a preference list to show only the desired channels.

The problem with this particular system is threefold: First, it is time consuming to pull up the programmed channel guide. Generally, the user must first activate a general menu, then select a preference option, then select his particular preference list. The process requires the user to hit multiple buttons and view multiple screens on the television or monitor.

Second, to determine which particular user guide is active at any one time, the prior art system requires the user to activate the general menu, thereby requiring information to be displayed on the screen. Displaying this information often interferes with the video and audio that is currently being displayed, as the video generally gets reduced in size to accommodate the additional information. There is no quick way to determine which profile is active without interrupting the broadcast.

Third, this prior art solution is only tailored to channel guide. While the prior art systems are effective for customizing channel guides, other features, like show suggestions, viewing preferences, and recorded programs are generally not customizable.

There is thus a need for an improved device for quickly and easily selecting and displaying programmed preferences.

Figure 1:
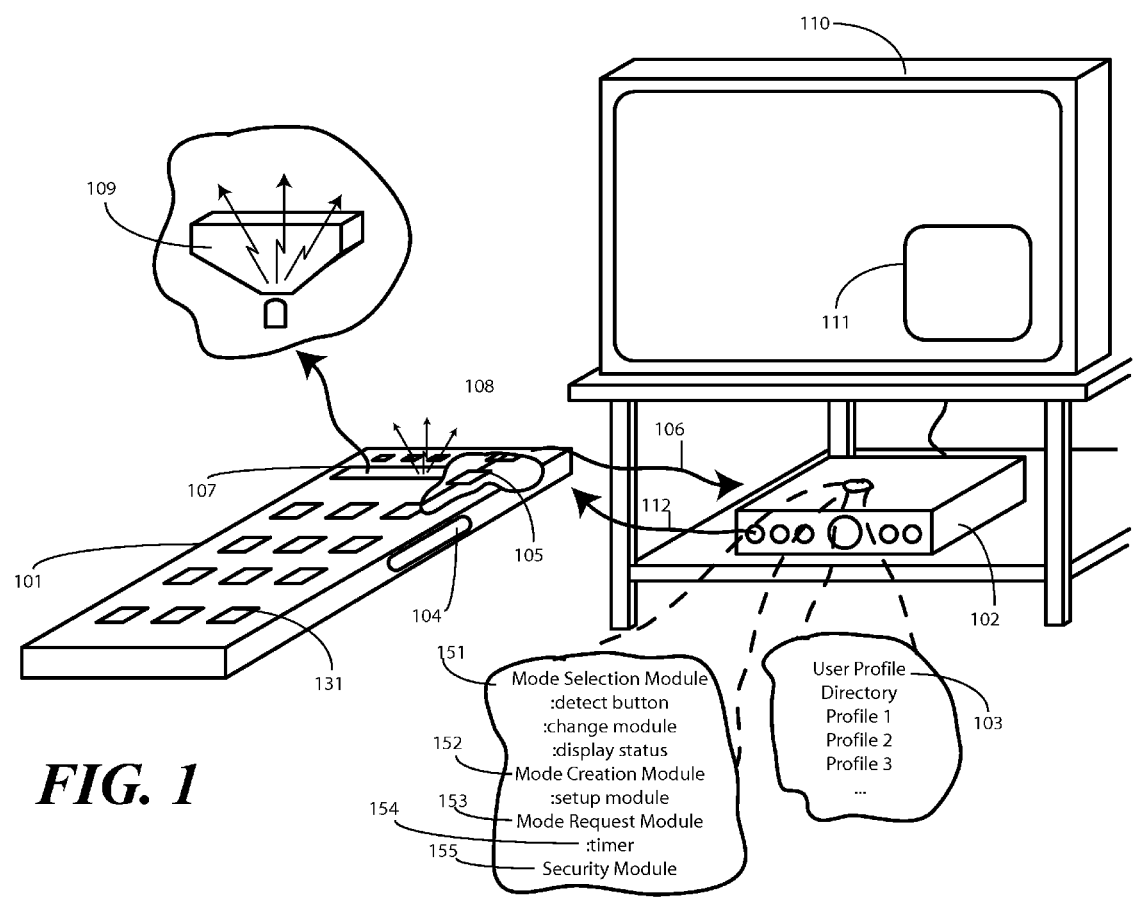
FIG. 1 illustrates one embodiment of a system employing a remote control device in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to a control device, such as a remote control device, having a single user profile selector and a corresponding user profile indicator. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of the control device and user profile selector as described herein. The non-processor circuits may include, but are not limited to, a radio receiver, a radio transmitter, an infra-red transmitter and receiver, signal drivers, clock circuits, power source circuits, and user input devices. As such, these functions may be interpreted as steps of a method to perform user profile selection with a control device having a user profile selector and corresponding indicator. Alternatively, some or all functions could be implemented by a state machine that has no stored program instructions, or in one or more application specific integrated circuits, in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." In this document, relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

As illustrated and described below, embodiments of the invention provide a method, apparatus, and system configured to enable the selection and indication of one of several user profiles associated with an electronic device, such as a television or set-top box. As used herein, a "set-top box" refers to any control device configured to receive audio or video content and deliver it to a user. By way of example, a receiver or digital video recorder configured to work with cable television signals or satellite television signals would be one type of set-top box.

In accordance with embodiments of the invention, multiple user profiles may be established and stored either within the electronic device or within a control unit, one example of which is a remote control. In one embodiment, the control unit has a single user profile selector button. When the user actuates the single user profile selector button, which may be any of a push-button, keypad switch, shuttle, jog dial, biometric sensor switch, or voice activated control, the current user profile changes accordingly.

In one embodiment, the control unit further includes an indicator that displays indicia of the presently selected profile to the user. Thus, the user may simply look at the control unit to determine which profile has been selected without interrupting a currently broadcasting show. In one embodiment, the indicator displays the current user profile upon a user actuating an indicator button. Examples of indicators include a liquid crystal display (LCD) or a light emitting diode (LED). Where the light emitting diode is used, the light emitting diode may cause an indicator light pipe or selected keys on the control unit to change color.

When the various user profiles are stored on the electronic device and are selected with the control unit, other features may be added to each profile. For example, the electronic device or set-top box may include a prediction algorithm that corresponds to the selected user preference. The prediction algorithm compares previously selected content to upcoming schedules to predict potentially interesting new content for the user of that particular profile. Thus, when a user selects his particular profile with the control unit, the electronic device loads the corresponding set of preferences from a locally stored user profile database, so that future predictions may be computed in accordance with this user's preferences. Further, upon selecting a particular profile, any subsequent preference input detected, such as a preferred program, program rating, or usage information, will be added to this selected profile.

In one embodiment, when a particular user profile is activated, that user's personal channel list may also be automatically activated so that channel browsing order follows the current user's previous settings. For instance, predicted information may be displayed along with the programmed channel list that includes information such as title, genre, program description, predicted rating, etc.

Turning now to FIG. 1, illustrated therein is one embodiment of a system having a plurality of selectable user profiles, with each user profile 103 being selectable by a control unit 101. In one embodiment, the control unit 101 is a control device, such as a wireless remote control, that includes a profile selector 104, a transmitter 105 that is responsive to the profile selector 104, and an indicator 107. The control unit is configured to communicate with an electronic device 102. As noted above, the electronic device 102 may be a set-top box, but may likewise be a television set, a computer configured for multimedia delivery, a home entertainment system, or other audio-visual device configured to receive multimedia content and deliver it to a user.

The electronic device 102 has associated therewith a plurality of modes of operation. As noted above, these modes may include a plurality of user profiles. For example, in a family of four, each of the mother, father, son, and daughter may program in a profile that includes preferred channels, recorded programs, predicted programs, display characteristics and so forth. While the modes may include operating characteristics that are different from or are in addition to the user profiles, when used with a control unit 101 having a profile selector 104, at least some of the modes of operation correspond to user profiles.

The control unit 101 is configured to communicate with the electronic device 102. In one embodiment, the profile selector 104 comprises a single profile selector or selection button. The single user profile selection button is capable of selecting at least one mode or user profile from the plurality of user profiles or modes. In one embodiment, the single user profile selection button is disposed on the side of the control unit 101 so as to be easy to access with a thumb.

When the profile selector 104 is actuated, a transmitter 105 responsive to the profile selector 104 is configured to transmit a user change signal 106 to the electronic device 102. This user change signal 106 causes the electronic device 102 to change from a first user profile to a second user profile. For instance, when the mother is watching a program associated with her profile, and leaves to run an errand, the daughter may change to her profile by actuating the profile selector. When this occurs, the transmitter 105 in the control unit 101 sends the user change signal 106 to the electronic device 102. The electronic device 102 then changes from the mother's profile to the daughter's profile.

The control unit 101 also includes an indicator 107 that is configured to change a profile indication indicia 108 upon actuation of the profile selector 104. The indicator 107 is configured to change appearance upon selection of one of the modes of operation or upon selection of one of the user profiles. This appearance change may be done by color, text, sound, direction of emitted light, or light intensity. Other suitable appearance changes will be clear to those of ordinary skill in the art having the benefit of this disclosure.

In one embodiment, the indicator 107 is a light source, such as a light emitting diode, which is capable of emitting light in one of a plurality of colors. When the profile selector is actuated, the light 108 changes color, thereby indicating a different user profile. By way of example, the indicator 107 may be a dual red and green light emitting diode that emits green light by actuating one light emitting diode, emits red light by actuating the other light emitting diode, and emits yellow light by actuating both light emitting diodes. Other equivalent multi-color light sources will be clear to those of ordinary skill in the art having the benefit of this disclosure.

Where the indicator 107 is a multicolor light source, a light pipe 109 may be used in conjunction with the indicator 107 to facilitate better projection of light 108 to the user. The light pipe 109 may be an ornamentally designed piece of plastic or glass that directs light 108 to the user, thereby indicating which profile is selected. With the use of an indicator 107, as well as the optional use of the light pipe 109, the user is able to determine which profile is selected without having to look at the electronic device 102 or a video display 110 coupled thereto.

In one embodiment, the various keys 131 of the control unit 101 themselves may serve as light pipes. Where the keys 131 are manufactured from a translucent material, the indicator 107 may be placed beneath the keys 131 such that the indicator light projects through the keys 131 to the user. In such an embodiment, one, multiple, or all keys 131 may change color so as to easily and quickly identify the profile currently selected to the user. Thus, as the indicator 107 changes its color, the various keys on the keypad, such as play, stop, fast-forward, change in a corresponding fashion.

Where light is used as the indicator 107, sequential actuations of the profile selector 104 cause the list of profiles, and corresponding list of colors, to cycle. In one embodiment, the color cycling scheme includes a default, uncolored mode to represent anonymous users. The profile selector 104 may also be used with sequential actuations as a control device. For instance, if a profile is currently selected, pressing the profile selection button once may show the currently selected profile, and reactivate the indicator 107 where it had been deactivated for energy saving purposes. Similarly, pressing the profile selector 104 twice may select the default mode, which may be the first mode in the cycling scheme. By allowing a user to jump to the default mode, the user is able to easily log-off when finished viewing content by quickly returning to the default mode.

In another embodiment, the indicator 107 comprises a display, such as a liquid crystal display, disposed atop the control unit 101. Where the indicator 107 is a display, the display may be configured to display one of a plurality of profile indicator messages. For example, the display may present, "Current Profile: Mom". Other information may be presented, including suggestions, current channel, current show, and so forth.

As noted above, the user profiles may be stored either within the control unit 101 or the electronic device 102. Thus, the control unit 101 may be configured to operate in either synchronous mode or asynchronous mode in causing the electronic device to switch from one mode to the next. In asynchronous mode, when the profile selector 104 is actuated, the transmitter 105 of the control unit sends the user change signal 106 to the electronic device 102, and then causes the indicator 107 to change appearance, thereby indicating that the electronic device has changed modes. This indicator change in the control unit 101 is done independent of the electronic device 102.

In synchronous mode, when the profile selector 104 is actuated, the transmitter 105 sends the user change signal 106 to the electronic device 102. In this embodiment, the control unit transmitter 105 is configured as a transceiver, having both transmitter and receiver. The electronic device 102 also includes a transceiver configured to communicate wirelessly with the receiver in the control unit 101. Upon sending the user change signal 106, thereby indicating selection of a mode, the control unit 101 waits to receive an acknowledgement signal from the electronic device 102, as the transceiver in the electronic device is configured to transmit a mode change signal 112 to the control unit. In addition to the acknowledgement, the electronic device 102 may send additional information, such as the indication color to be used with the next profile, or the icon to be displayed by the control unit 101 for the next profile. Where this additional information is included, the circuitry of the control unit 101 may be simplified in that most of the intelligence is embedded in the electronic device 102. This mode change signal 112 thereby confirms that the user profile or mode of operation within the electronic device 102 is changed. Upon receiving the acknowledgement, the indicator 107 of the control unit 101 changes appearance. Suitable communication technologies to accommodate two-way communication include Bluetooth or WiFi communication protocols.

While the indicator 107 provides one means of alerting a user as to which user profile or mode of operation has been selected, in one embodiment the electronic device 102 includes a mode selection module 151 configured to indicate a mode selection status to the user. This mode selection status, which may be presented to the user on a video display 110, provides an alternate mode selection indicia. Note also that when the control unit 101 is operating in synchronous mode, and where the indicator 107 is a display, the electronic device 102 may deliver the mode selection status to the control unit 101 along with the acknowledgement such that the mode selection status may be presented on the display.

The mode selection status may include not only which mode or user profile is selected, but may include other information as well. For instance, the mode selection status may include personalized text, such as "John's profile". The mode selection status may also include a picture of the user associated with the selected profile. In one embodiment, the mode selection status includes at least a mode name and one or more mode characteristic information indicia, as set forth herein.

Where the electronic device 102 comprises a receiver for television signals, along with a corresponding video display 110, the mode selection status may temporarily appear as visual indicia 111 on the video display 110. The mode selection status may then disappear after a small amount of elapsed time, or as soon as the user pushes another button on the control unit 101. Optionally, the electronic device 102 or the mode selection module 151 may compute and display the rating of the current content being displayed as a part of the mode selection status. The electronic device 102 may also compute a predicted rating for all other channels in the selected profile, and further display the program with the highest score with an option for the user to directly jump to this program. For parental control, the user could be asked to enter his password to select a profile if the owner of the profile has enabled such a password.

To create or establish the various modes or user profiles, in one embodiment the electronic device 102 includes a mode creation module 152. The mode creation module 152 is configured to receive a mode creation signal from the control unit 101, which indicates that a user desires to create a new mode or profile. Upon receipt of the mode creation signal, the mode creation module 152 is actuated.

In one embodiment, the manufacturer may provision several default modes in either the control unit 101 or electronic device 102. For instance, the manufacturer may establish a default father's, mother's, and children's modes. In such an embodiment, the user can use the mode selection feature right "out of the box" without the need for additional set-up.

Where user profiles are pre-provisioned, a user may employ the mode creation module 152 to customize each provisioned user profile at start-up using a procedure that allows the user to enter some preferences and also choose a color to represent the profile. The electronic device 102 then informs the control unit that a new profile has been created. The control unit may then add a new color and corresponding profile to its cycle list. A similar operation takes place if a given profile is deleted. The user may also provide preference information at later times. One exemplary method with which this may be accomplished is by rating a program.

As referenced above, one suitable application for embodiments of the invention relates to television content delivery, be it through air, broadband network, cable, or satellite. As such, in one embodiment, the electronic device 102 comprises a receiver for television signals with a video display 110 coupled thereto. Signals are received, and optionally decoded, with the electronic device 102, and are then delivered to the video display 110.

Since some of the television signals and corresponding programs may be not suitable for children, in one embodiment the electronic device 102 includes a security module 155 configured to block selected content with a security code. Since some users will have the blocked content included with their profile, and others will not, in one embodiment the security module 155, when active, prompts a user for a security input upon the selection of a user profile including the blocked content. The security input may be a password or PIN. For example, continuing the family example from above, if the mother and father have access to late night comedy shows, but the children do not due to their early bedtimes, when either the mother's profile or father's profile is selected, the security module 155 prompts for a security input.

In some situations, one user will select a mode or profile and begin using the electronic device 102. There are circumstances in which the user may just leave the room while the electronic device continues operating. For instance, the user may need to run an errand and may forget to turn off the video display 110 or the electronic device 102. As an optional feature, in one embodiment, the electronic device 102 includes a mode request module 153 and a timer 154. When a mode is selected, the timer 154 actuates. Upon expiration of the timer 154, the mode request module 153 delivers a mode selection request on the screen. For instance, where the timer 154 is set for four hours, and the four hours lapse, the mode request module 153 may present the following message on the video display 110: "Continue with this profile? Or select another?" Similarly, if the control unit 101 has not been used for some time, such as one hour, the mode request module may optionally ask the user for a confirmation of the selected profile to prevent a user from adding channels or entering a rating accidentally in another user's profile.

The keys 131 of the control unit may include temporal control capabilities as well. For example, in another embodiment, the user may press profile selector 104 continually for a certain period of time, such as 2 seconds for instance. Upon doing this, the transmitter 105 of the control unit 101 then sends a signal to the electronic device to actuate one of the modules. Holding the profile selector 104 for 2 seconds, for instance, may cause the mode creation module 152 to actuate, thereby allowing creation of a new profile. Where color-changing lights are used as the indicator 107, and a new profile is added, a new color may be added to the set of displayable colors in the control unit 101.

Similarly, where some user profiles require the entry of a security input, the control unit 101 may additionally have temporal aspects. By way of example, where the control unit 101 is idle for a predetermined time with Father's profile, when one family member tries to use the remote control, the electronic device 102 may ask the user to enter the security code. If the user does not know the security code, he may actuate the profile selector 104 until he finds his profile. Similarly, where the control unit 101 is idle for a predetermined time with the Mother's profile, the next user may again be asked to enter a security code.

Figure 2:
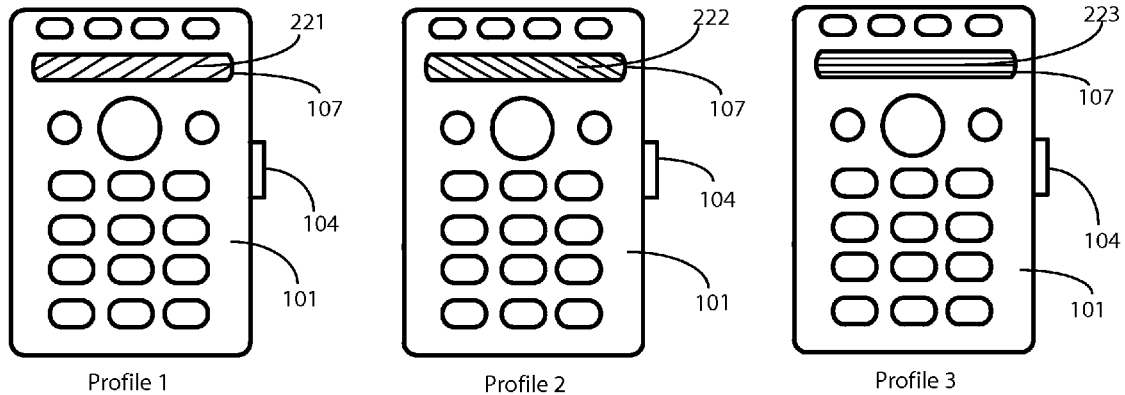
FIG. 2 illustrates one embodiment of a control device having a user profile selector button and a first indicator in accordance with the invention.
Figure 3:
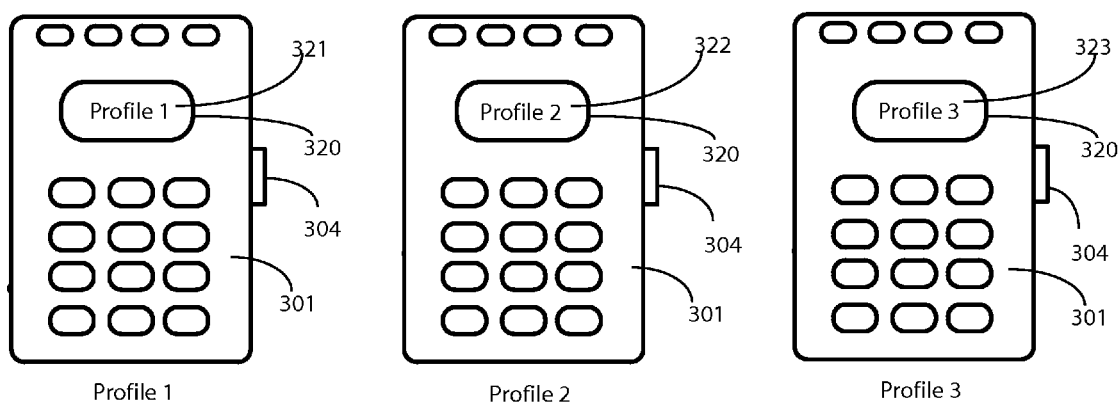
FIG. 3 illustrates another embodiment of a control device having a user profile selector button and an alternate indicator in accordance with the invention.
Figure 4:
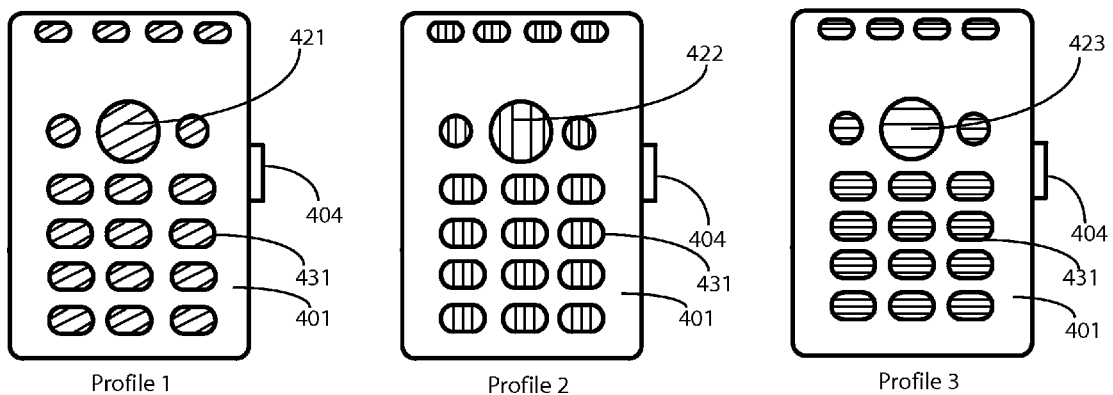
FIG. 4 illustrates another embodiment of a control device having a user profile selector button and an alternate indicator in accordance with the invention.

Turning now to FIGS. 2-4, illustrated therein are some exemplary indication schemes for presenting indicia of the selected mode or user profile with the control unit 101. Beginning with FIG. 2, a multi-color light source is being used as the indicator 107. The multi-color light source is directed through an ornamental light pipe that has been integrated into the control unit 101. After the profile selector 104 is actuated, a first color 221 is displayed through the light pipe as the indicator 107. Upon actuating the profile selector 104 again, a second color 222 is projected through the light pipe as the indicator 107. Upon pressing the profile selector 104 a third time, a third color 223 is projected through the light pipe as the indicator 107.

At FIG. 3, a display 320 on the control unit 301 is used to identify the currently selected profile. Upon actuation of the profile selector 304 is actuated, a first message 321 is presented on the display 320. Upon actuating the profile selector 304 again, a second message 322 is presented on the display 320. Upon pressing the profile selector 304 a third time, a third message 323 is presented on the display 320.

At FIG. 4, the translucent keys 431 are used on the control unit 401 as indicators. Upon actuation of the profile selector 404, a first color 421 is displayed through the translucent keys 431. Upon actuating the profile selector 404 again, a second color 422 is projected through the translucent keys 431. Upon pressing the profile selector 404 a third time, a third color 423 is projected through the translucent keys 431. The exemplary embodiments of FIGS. 2-4 are not intended to be limiting. It will be clear to those of ordinary skill in the art having the benefit of this disclosure that other indicator schemes may be used to present mode status to the user.

Figure 5:
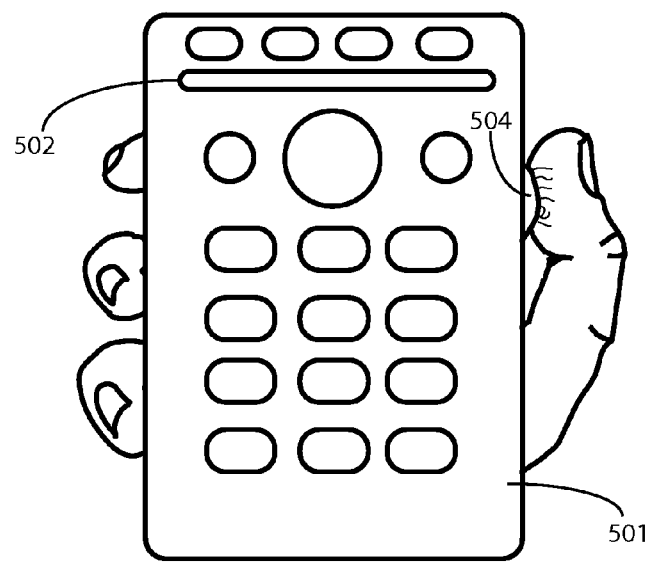
FIG. 5 illustrates a control device employing a biometric sensor in accordance with embodiments of the invention.

Turning now to FIG. 5, illustrated therein is an alternate form of profile selector 504 in accordance with one embodiment of the invention. In the embodiment of FIG. 5, the control unit 501 includes a biometric sensor as the profile selector 504. Suitable biometric sensors include finger print readers and other touch sensitive identification devices. When the biometric profile selector 504 is actuated and the mode or user profile associated therewith changes, the indicator 502 correspondingly changes to indicate the current mode or user profile.

Figure 6:
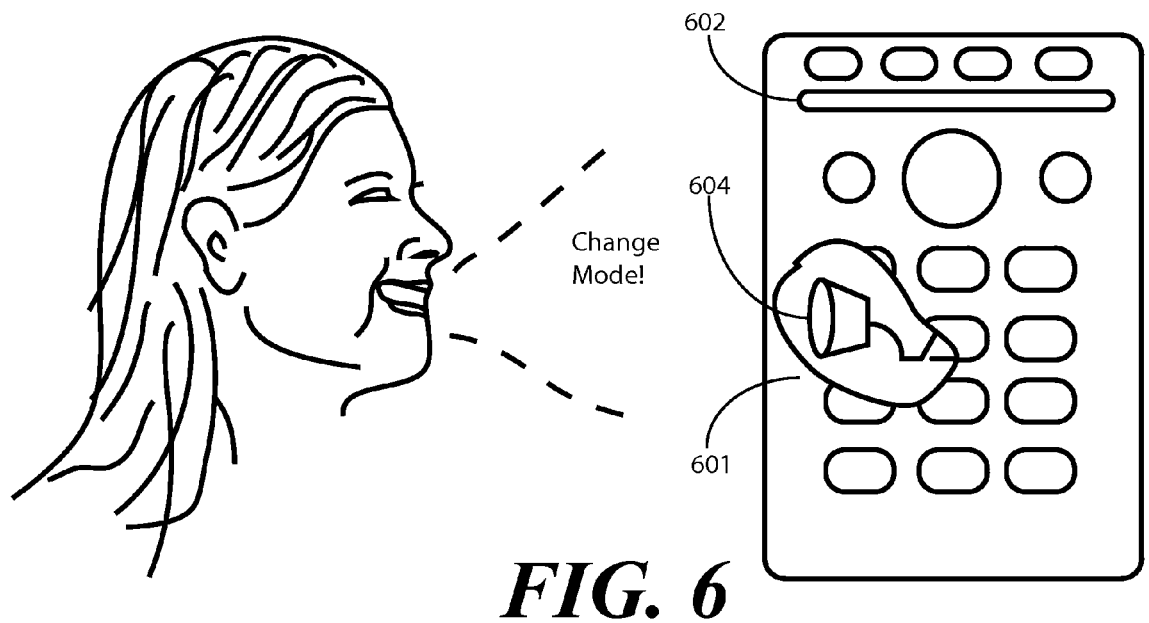
FIG. 6 illustrates a control device employing a voice actuation control in accordance with embodiments of the invention.

Turning now to FIG. 6, illustrated therein is another alternate form of profile selector 604 in accordance with one embodiment of the invention. In the embodiment of FIG. 6, the control unit 601 includes a voice-activated switch as the profile selector 604. When the voice-activated profile selector 604 is actuated and the mode or user profile associated therewith changes, the indicator 602 correspondingly changes to indicate the current mode or user profile.

Figure 7:
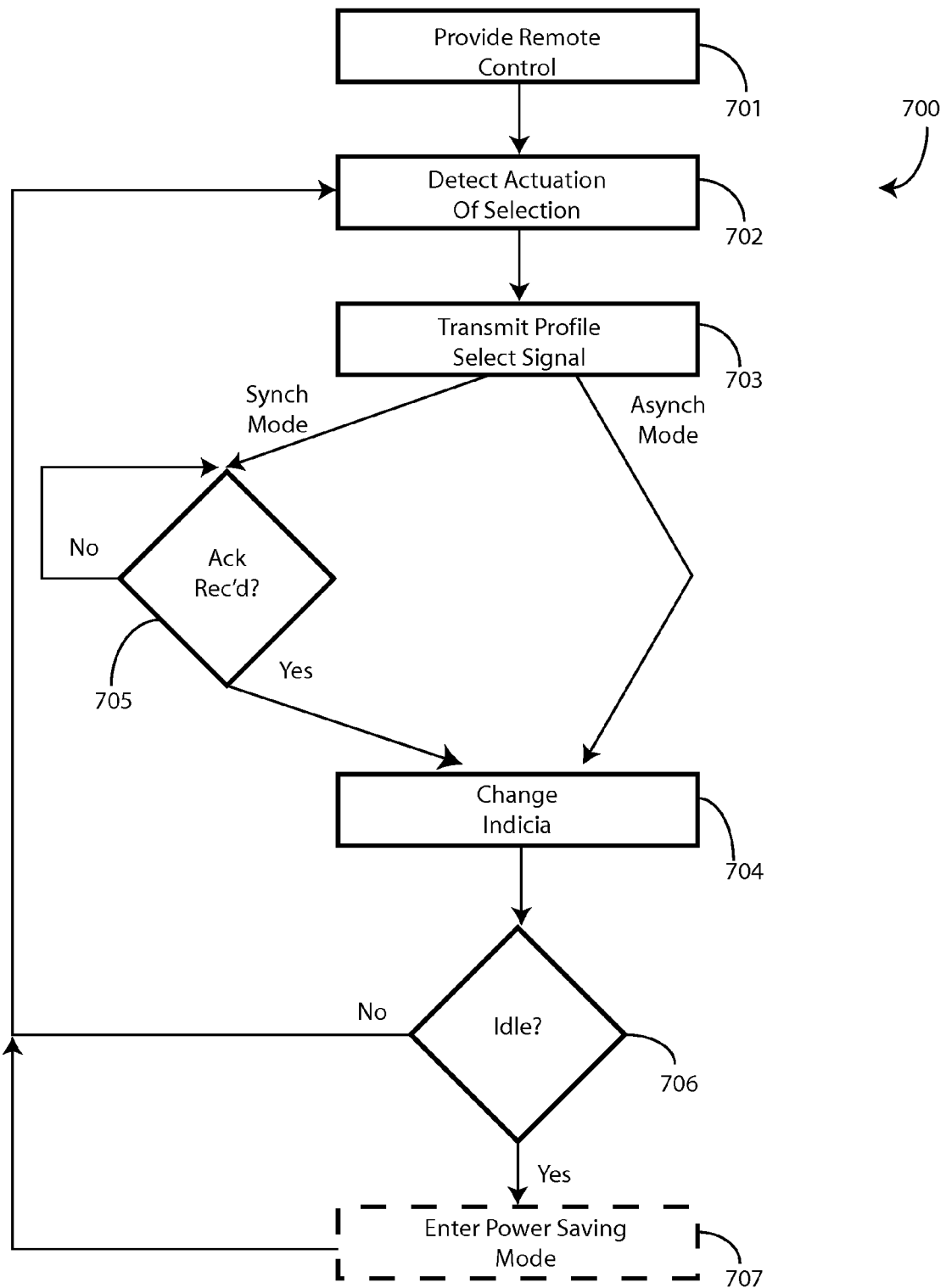
FIG. 7 illustrates a method associated with a control device in accordance with embodiments of the invention.

Turning now to FIG. 7, illustrated therein is one embodiment of a method 700 for use with the invention. The method 700 may be implemented as software or embedded firmware within a control unit (101) to allow simple mode selection and presentation of the selected mode to a user.

At step 701, a control unit including a selector for selecting one of a plurality of profiles is provided. The control unit includes a transmitter configured to at least transmit a profile change signal to a remote device upon actuation of the selector. Additionally, the control unit includes an indicator having one or more indicia states. The indicia states correspond to each of the modes.

At step 702, the control unit detects actuation of the selector. By way of example, the selector may be a single profile selector button disposed on the top or side of the control unit. When the single profile selector button is actuated, the control unit detects this actuation at step 702. The detection of selector actuation may take many forms. Examples include detecting actuation of a button, receiving biometric information, and detecting voice or audible signals. Additionally, the detection of selector actuation may include a temporal component, such as detecting actuation of a button for at least a predetermined duration. Similarly, the detection of selector actuation may include detecting at least a predetermined number of button actuations. Either the predetermined duration or a particular predetermined number of button actuations may correspond to a default state, as is indicated above.

Once selector actuation is detected, the control unit transmits a profile change signal at step 703. This profile change signal may be transmitted to a remote electronic device, such as a set-top box or television signal receiver.

As noted above, the control unit may operate in either a synchronous or asynchronous mode. Where the control unit is operating in an asynchronous mode, an indicia state of the indicator is changed from a first indicia state to a second indicia state. Where color is used as the indicia, perhaps projected from a multicolor light source through a light pipe, the indicator may change from the first indicia state to the second indicia state by changing from a first color to a second color. Where a display is used to present indicia, such as a liquid crystal display, the indicator may change from a first indicia state to a second indicia state by removing a first message, pictures, or characters from the display and presenting a second message, pictures, or characters on the display.

Where the control unit is operating in synchronous mode, the method 700 includes the step of receiving a profile change acknowledgement from an electronic device as indicated at decision 705. Upon receiving the profile change acknowledgement, the indicia of currently selected mode or profile is changed at step 704.

In one embodiment mentioned briefly above, the control unit is configured to enter a power saving mode after a predetermined duration of non-use. In such an embodiment, the control unit may check to see whether the predetermined duration of non-use has elapsed at decision 706. Where this is the case, the control unit may enter the power saving mode at step 707. When in the power saving mode, the control unit exits the power saving mode upon the step of detecting the actuation of the selector at step 702.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A control unit for wirelessly controlling an electronic device, wherein the electronic device has at least one user profile associated therewith, the control unit comprising:
    a processor;
    a profile selector, the processor configured to detect actuation of the profile selector, wherein detecting actuation comprises detecting at least a predetermined number of button actuations of a single profile selection button;
    a transmitter, the processor further configured to cause the transmitter to transmit, to the second device, a user change signal upon detecting actuation of the profile selector; and
    an indicator configured to change an appearance of the control unit by presenting profile indication indicia on the remote control unit, wherein the indicator further comprises a light source capable of emitting a light in one of a plurality of colors, and a light pipe disposed along the control unit through which the light passes;
    the processor further configured, upon detecting actuation of the profile selector, to cause the indicator to change an indicia state of the indicator from a first indicia state to a second indicia state by changing the light source from emitting a first color to emitting a second color; wherein the first indicia state is a present indicia state and the second indicia state is a default indicia state.

2. The control unit of claim 1, wherein the profile selector comprises a single profile selector button.

3. The control unit of claim 2, wherein the light changes color upon actuation of the single profile selection button.

4. The control unit of claim 1, wherein the indicator further comprises one or more translucent keys disposed along the control unit through which the light passes.

5. The control unit of claim 1, wherein the indicator further comprises a display configured to display one of a plurality of profile indicator messages.

6. The control unit of claim 1, wherein the profile selector further comprises one or more of the group consisting of a biometric sensor and a voice activated switch.

7. A remote control unit for wirelessly controlling an electronic device, wherein the electronic device has at least one user profile associated therewith, the control unit comprising:
    a processor;
    a selector for selecting one of a plurality of profiles;
    a transceiver comprising a transmitter configured to at least transmit a profile change signal; and
    an indicator having a plurality of indicia states;
    the processor configured to detect actuation of the selector, wherein detecting actuation of the selector comprises detecting actuation of a profile selection button, wherein detecting actuation of the profile selection button comprises detecting actuation of the button for at least a predetermined duration;
    the processor further configured to cause the transceiver in the remote control unit to transmit a profile change signal;
    the processor further configured to receive a profile change acknowledgement;
    the processor further configured, responsively to receiving the profile change acknowledgement, to change an indicia state of the indicator from a first indicia state to a second indicia state, wherein changing the indicia state of the indicator occurs after the step of receiving the profile change acknowledgement.

8. A method of selecting a user profile, comprising the steps of:
    providing a remote control unit comprising a selector for selecting one of a plurality of profiles, a transmitter configured to at least transmit a profile change signal, and an indicator having a plurality of indicia states;
    detecting actuation of the selector, wherein the step of detecting actuation of the selector comprises detecting actuation of a profile selection button, and wherein the step of detecting actuation of the profile selection button comprises detecting at least a predetermined number of button actuations,
    transmitting, by a transmitter in the remote control unit, a profile change signal; and
    changing an indicia state of the indicator from a first indicia state to a second indicia state, wherein the step of changing the indicia state comprises the step of changing a light source from a first color to a second color, and further wherein the step of changing the indicia state of the indicator comprises changing the indicia state from a present indicia state to a default indicia state.

9. The method of claim 8, wherein the step of detecting actuation of the selector further comprises a step selected from the group consisting of receiving biometric information, and detecting voice.

10. The method of claim 8, wherein the step of changing the indicia state further comprises the step of changing characters presented upon a display.

11. A method of selecting a user profile, comprising the steps of:
provides a remote control unit comprising a selector for selecting one of a plurality of profiles, a transmitter configured to at least transmit a profile change signal, and an indicator having a plurality of indicia states;
detecting actuation of the selector, wherein the step of detecting actuation of the selector comprises detecting actuation of a profile selection button, wherein the step of detecting actuation of the profile selection button comprises detecting actuation of the one button for at least a predetermined duration;
transmitting, by the transmitter in the remote control unit, a profile change signal;
receiving a profile change acknowledgement; and
changing an indicia state of the indicator from a first indicia state to a second indicia state, wherein the step of changing the indicia state of the indicator occurs after the step of receiving the profile change acknowledgement.

12. A method of selecting a user profile, comprising the steps of:
providing a remote control unit comprising a selector for selecting one of a plurality of profiles, a transmitter configured to at least transmit a profile change signal, and an indicator having a plurality of indicia states;
detecting actuation of the selector, wherein the step of detecting actuation of the selector comprises detecting actuation of a profile selection button, wherein the step of detecting actuation of the profile selection button comprises detecting actuation of the one button for at least a predetermined duration;
transmitting, by the transmitter in the remote control unit, a profile change signal; and
changing an indicia state of the indicator from a first indicia state to a second indicia state;
the method further comprising the step of entering a power saving mode, and upon entry of the power saving mode, exiting the power saving mode upon the step of detecting the actuation of the one button.

13. A system having a plurality of selectable user profiles, the system comprising:
a. an electronic device having a plurality of modes of operation, wherein at least some of the plurality of modes of operation correspond to a plurality of user profiles; and
b. a remote control unit configured to communicate with the electronic device, the remote control unit comprising a single user profile selection button, a transmitter responsive to the single user profile selection button capable of selecting at least one mode from the plurality of modes of operation, and a visual indicator configured to change appearance of the remote control unit upon selection of at least one mode from the plurality of modes of operation;
wherein the remote control unit further comprises a receiver, further wherein the electronic device comprises a transceiver configured to communicate wirelessly with the receiver, wherein upon selection of a mode, the transceiver is configured to transmit a mode change signal to the receiver, thereby causing the visual indicator to change appearance.

14. The system of claim 13, wherein the electronic device comprises a mode selection module configured to indicate a mode selection status to a user.

15. The system of claim 14, wherein the electronic device comprises a receiver for television signals, further comprising a video display coupled to the electronic device, wherein the mode selection status comprises visual indicia presented on the video display.

16. The system of claim 15, wherein the visual indicia comprises at least a mode name and one or more mode characteristic information indicia.

17. The system of claim 13, wherein the electronic device comprises a mode creation module, wherein upon receipt of a mode creation signal from the transmitter, the mode creation module is actuated.

18. The system of claim 13, wherein the electronic device comprises a mode request module and a timer configured to actuation upon a mode selection, wherein upon expiration of the timer, the mode request module is configured to deliver a mode selection request.

19. The system of claim 13, wherein the electronic device further comprises a security module configured to prompt for a security input upon selection of the mode from the plurality of modes.

* * * * *